US008755588B2

(12) United States Patent
Leloglu et al.

(10) Patent No.: US 8,755,588 B2
(45) Date of Patent: Jun. 17, 2014

(54) METHOD FOR AUTOMATIC REGION SEGMENTATION ON CARTRIDGE CASE BASE AND SELECTION OF THE BEST MARK REGION FOR CARTRIDGE CASE COMPARISON

(75) Inventors: Ugur Murat Leloglu, Ankara (TR); Ufuk Sakarya, Ankara (TR); Erol Tunali, Ankara (TR)

(73) Assignee: Tubitak-Turkiye Bilimsel ve Teknolojik Arastirma Kurumu, Ankara (TR)

( * ) Notice: Subject to any disclaimer, the term of this patent is extended or adjusted under 35 U.S.C. 154(b) by 697 days.

(21) Appl. No.: 12/989,393

(22) PCT Filed: Apr. 17, 2009

(86) PCT No.: PCT/IB2009/051609
§ 371 (c)(1),
(2), (4) Date: Oct. 22, 2010

(87) PCT Pub. No.: WO2009/130651
PCT Pub. Date: Oct. 29, 2009

(65) Prior Publication Data
US 2011/0188754 A1 Aug. 4, 2011

(30) Foreign Application Priority Data
Apr. 22, 2008 (TR) ................ a 2008 02780

(51) Int. Cl.
*G06K 9/00* (2006.01)
*G06K 9/36* (2006.01)
(52) U.S. Cl.
USPC .......................................... 382/141; 382/286
(58) Field of Classification Search
None
See application file for complete search history.

(56) References Cited

U.S. PATENT DOCUMENTS

| 5,390,108 | A | * | 2/1995 | Baldur et al. | 702/167 |
| 5,659,489 | A | * | 8/1997 | Baldur | 382/108 |
| 5,835,622 | A | * | 11/1998 | Koljonen et al. | 382/146 |
| 6,154,562 | A | * | 11/2000 | Baldur et al. | 382/141 |

(Continued)

FOREIGN PATENT DOCUMENTS

WO    WO 2006015475 A1    2/2006

OTHER PUBLICATIONS

"Firearm identification based on rotation invariant feature of cartridge case," P.Thumwarin, et al., SICE Annual Conference 2008 Aug. 20-22, 2008, The University Electro-Communications, Japan, p. 45-49.*

(Continued)

*Primary Examiner* — Wenpeng Chen
(74) *Attorney, Agent, or Firm* — Intellectual Property Law Group LLP (57) ABSTRACT

Segmentation of certain regions defined on a firearm cartridge case for successful automatic matching of cartridge cases after a cartridge is fired, on the basis of the marks left on the cartridge cases fired. Disclosed is a method for segmentation of a cartridge case base by using surface height matrix information comprising: detecting the center of the cartridge case base; according to this center, obtaining the polar height matrix by subjecting the surface height matrix to polar transformation; acquiring a one-dimensional signal, "Average Height Signal on the Basis of Radius" (AHSBR), by calculation of the mean value on the radius axis applied on the polar height matrix; determining regions similar to circle signal models on the AHSBR and detecting circles; determining the firing pin mark region by threshold processing of the primer region surface height matrix. Letters on the cartridge case base are detected by using slope matrices.

8 Claims, 5 Drawing Sheets

(56) References Cited

U.S. PATENT DOCUMENTS

| | | | |
|---|---|---|---|
| 6,327,032 B1* | 12/2001 | Lajeunesse et al. | 356/390 |
| 6,795,575 B1* | 9/2004 | Robinson et al. | 382/154 |
| 7,068,808 B1* | 6/2006 | Prokoski | 382/100 |
| 7,602,938 B2* | 10/2009 | Prokoski | 382/100 |
| 2004/0217173 A1* | 11/2004 | Lizotte et al. | 235/462.01 |
| 2007/0160267 A1 | 7/2007 | Jones et al. | |
| 2008/0069433 A1* | 3/2008 | Corcoran et al. | 382/149 |

OTHER PUBLICATIONS

"Optical Imaging Techniques for Ballistics Specimens to Identify Firearms," C.L.Smith et al., Proceedings. Institute of Electrical and Electronics Engineers 29th Annual 1995 International Carnahan Conference on Security Technology, 1995, p. 275-289.*

"Automated Cartridge Identification for Firearm Authentication," Jie Zhou et al., Proceedings of the 2001 IEEE Computer Society Conference on Computer Vision and Pattern Recognition, 2001. CVPR 2001, p. I-749-I754.*

"Ballistics Projectile Image Analysis for Firearm Identification," Dongguang Li, IEEE Transactions on Image Processing, vol. 15, No. 10, Oct. 2006, pp. 2857-2865.*

International Search Report, mailing date Jul. 31, 2009, for corresponding International Application No. PCT/IB2009/051609.

* cited by examiner

METHOD FOR AUTOMATIC REGION SEGMENTATION ON CARTRIDGE CASE BASE AND SELECTION OF THE BEST MARK REGION FOR CARTRIDGE CASE COMPARISON

TECHNICAL FIELD

One of the significant problems encountered in criminology studies is the successful automatic matching of cartridge cases after a cartridge is fired from a firearm, on the basis of the marks left on the cartridge cases fired. One of the probable steps in the solution of this problem is the segmentation of certain regions defined on the cartridge case. This invention relates to the method for segmentation of cartridge case base by using surface height matrix information.

BACKGROUND

Firearms leave marks on both cartridge cases and bullets of the cartridges they fire. Comparing these specific marks on different bullets or cartridge cases, one can determine whether these bullets or cartridge cases are fired from the same firearm. Thus, the relations between the incidents where the firearms which fired these cartridge cases and bullets were used can be revealed.

In matching process, instruments called comparison microscopes that are specially designed and produced basically for this purpose are used. The cartridge case or bullet pairs to be analyzed are placed on the relevant part of this microscope and the intended image is acquired by using the microscopic capabilities of zooming in and out, rotating, shifting, adjusting light intensity and angle, developed for these purposes. The expert who analyzes the image can determine whether these two cartridge cases or bullets that are subjected to comparison are fired from the same firearm.

This visual comparison is a rather time-taking process for the expert. Although there are already developed products available, development of automated systems which help the expert by making at least certain preliminary eliminations in this time-taking process is a significant problem in the criminology literature. In the criminology literature, this problem is named automated firearms identification.

There are many steps in the solution of the problem of automated firearms identification. First of all, the required data should be properly digitalized. Accurate acquisition of the marks on the cartridge case and bullet is another problem in itself. Two-dimensional (2D) or three-dimensional (3D) information based systems are used in the solution of this problem. A summary of the literature on data acquisition problem are given in a resource (U. Sakarya, U. M. Leloglu, E. Tunah, "Three-dimensional surface reconstruction for cartridge cases using photometric stereo", Forensic Science International, vol. 175, no. 2-3, pp. 209-217, 5 Mar. 2008). In order to find possible matches in the marks acquired, the exact feature which ensures success should be selected and this data should be promptly compared. The objective is to alleviate the expert's workload as far as possible by ensuring high identification success in an appropriate time period.

In a cartridge, the metal structure which contains the explosive and the bullet and which effectuates firing by the help of the primer (2) around it is called a cartridge case. A needlelike metal part of the firearm, called the firing pin, strikes the primer (2) igniting the igniter and the ignition explodes the explosive inside, and thus the cartridge is fired. In the meantime, under immense pressure and temperature, the cartridge case contacts the tray of the firearm under backward pressure. The immense pressure and temperature at the time of this contact results in sealing of the marks on the firearm tray against the cartridge case base (1) in accordance with the relevant physical process.

Figure 1:
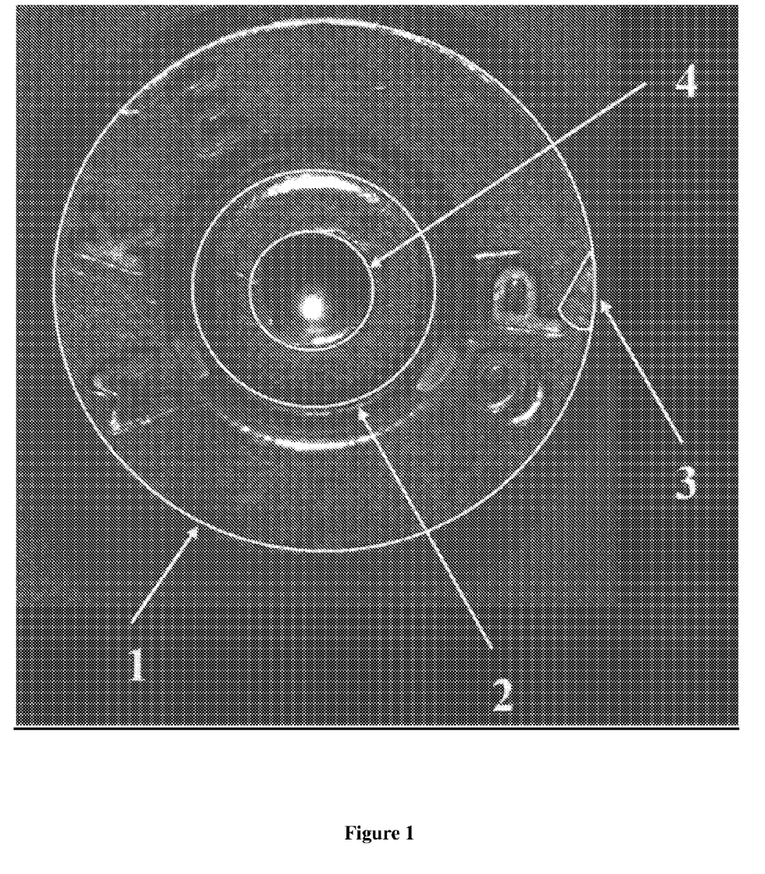
FIG. 1 is the cartridge case base image.
Figure 2:
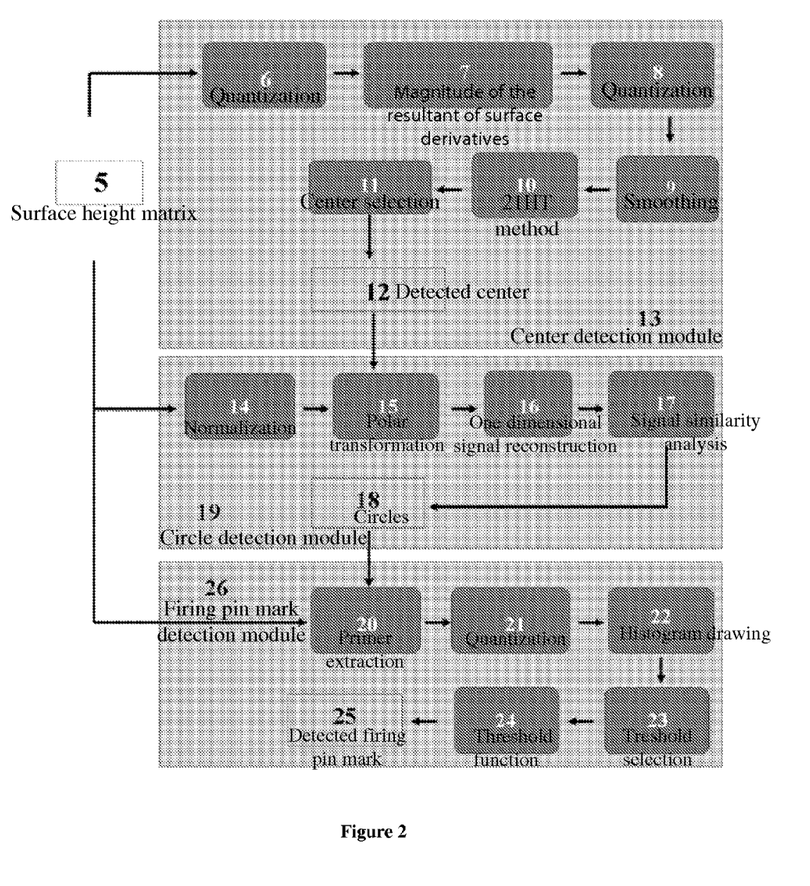
FIG. 2 is the general architecture of the method.
Figure 3:
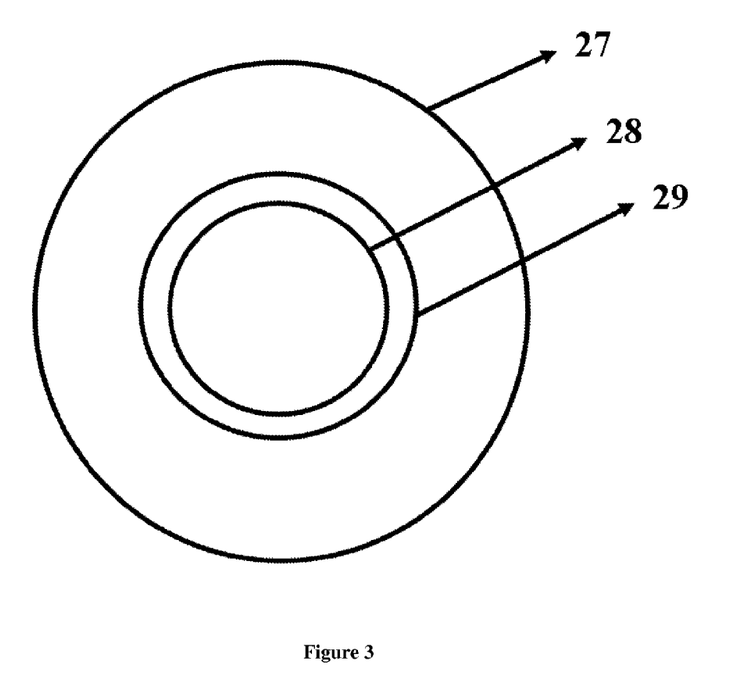
FIG. 3 shows the circles on the cartridge case.

Cartridge cases fired from the same firearm is called sister cartridge cases. On the cartridge case base (1), basically three regions are investigated for the purpose of determination of sisterhood by ballistic image analysis. These are the primer (2), the ejector mark (3) and the firing pin mark (4). These regions are shown in FIG. 1.

Ejector is a name given to the mechanism that, after the ignition is effectuated and the bullet leaves the barrel, ejects the empty cartridge case out of the firearm. Although there are various mechanisms for ejection of the cartridge case out of the firearm, the most favorite method is that a pin called ejector hits the case wall and extracts it from the firearm. The ejector mark (3) left by the ejector pin on the cartridge case is one of the marks used in determination of sisters.

In determination of sisterhood by ballistic image analysis, the second region analyzed is the region of the firing pin mark (4). The marks left during the firing pin's entry into and exit out of the primer (2) are used in determination of the sister cartridge case.

Finally, the marks left on the cartridge case base (1) as a result of the high pressure created during firing are used in determination of the sister cartridge case. Here, as it is seen in FIG. 1, on the cartridge case base (1), presence of letters or special marks on the outside (the region between the circles no (1) and (2)) of the primer (2) area makes the analysis somewhat more difficult. Thus, in order to see the breech face marks, areas outside the firing pin mark (4) on the primer (2) are analyzed first. On the cartridge case base (1), presence of production-related marks (letters, prints, etc.), besides ballistic marks, somewhat complicates the matching process. Although certain types of cartridge cases have different shapes, cartridge cases in general have the structure shown in FIG. 1. The primer (2) is explicitly distinguished from the outer part of the cartridge case base (1). Furthermore, there are also certain marks and letters on the cartridge case base (1) outside the primer (2) area.

In the state of the art, certain regions on the cartridge case are segmented by the user while the cartridge case is recorded in a cartridge case data recording unit. For example, the BALISTIKA system developed by TÜBİTAK UZAY works this way. Automation of this segmentation process is a significant step especially for rapid data entry. In the current state of the art, furthermore, since letters and marks are present on the cartridge case base (1) on regions outside the primer (2), these regions are not generally used in the automatic matching process. Detection and elimination of these letters and marks, and usage of the remaining regions in the matching process may contribute positively to the automatic matching success.

Methods have been developed to make automatic cartridge case base (1) segmentation on the basis of 2D data. One of them is a method that operates in a system called Fireball (D. G. Li, "Image processing for the positive identification of forensic ballistics specimens", *Proceedings of the Sixth International Conference of Information Fusion*, vol. 2, pp. 1494-1498, 2003): An edge map of the 2D cartridge case image is obtained by using the Canny edge detection method (J. Canny, "A Computational Approach to Edge Detection", *IEEE Transactions on Pattern Analysis and Machine Intelligence*, pp. 679-698, 1986). On this edge map, the circles on the cartridge case base (1) are acquired by using the method of direct least squares fitting of ellipses (A. W. Fitzgibbon, M. Pilu and R. B. Fisher, "Direct least squares fitting of ellipses", Proceedings of the 13th International Conference on Pattern Recognition, vol. 1, pp. 253-257, 25-29 Aug. 1996).

In another study, (J. Zhou, L. Xin, G. Rong ve D. Zhang, "Algorithm of automatic cartridge identification", *Optical Engineering, vol.* 40, no. 12, pp. 2860-2865, 2001), first, the cartridge case base (1), the most outer circle, is found. The Hough transform method used for circle detection (L. G. Minor ve J. Sklansky, "Detection and segmentation of blobs in infrared images", *IEEE Trans. SMC*, vol. 11, pp. 194-201, 1981) is used for cartridge case base (1) detection. The ejector mark (3) is found by a local frequency spectrum analysis made in the outer circle region. The active snake method (C. Xu and J. L. Prince, "Snakes, shapes, and gradient vector flow", *IEEE Trans. Image Process*, vol. 7, no. 3, pp. 359-369, 1998) is used for the estimation of the firing pin mark (4) region.

In another study, in order to detect the circles and letters on the cartridge case base (1), Brein (C. Brein, "Segmentation of cartridge cases based on illumination and focus series", *Proceedings of SPIE*, vol. 5685, Image and Video Communications and Processing 2005, Amir Said, John G. Apostolopoulos, Editors, pp. 228-238, March 2005) used image series under varied illumination conditions (point, ring, diffuse). Randomized Hough transform method (L. Xu, E. Oja and P. Kultanen, "A new curve detection method: Randomized Hough Transform (RHT)", *Pattern Recognition Letters*, vol. 11, no. 5, pp. 331-338, 1990) was used for circle detection.

An automatic segmentation method on 3D cartridge case data was also developed (C. Brein, "Segmentation of cartridge cases based on illumination and focus series", Proceedings of SPIE, vol. 5685, Image and Video Communications and Processing 2005, Amir Said, John G. Apostolopoulos, Editors, pp. 228-238, March 2005). 3D cartridge case data are acquired by the depth-from-focus method. Following the preprocessing carried out on the 3D data, the randomized Hough transform method (L. Xu, E. Oja and P. Kultanen, "A new curve detection method: Randomized Hough Transform (RHT)", *Pattern Recognition Letters*, vol. 11, no. 5, pp. 331-338, 1990) is used to detect circles. Letters are also detected by using 3D data.

Technical Problems that the Invention Aims to Solve

As explained above, together with the increased number of cartridge cases, automatic entry of cartridge case data has turned out to be a significant problem. Automatic implementation of the process will eliminate the need for employment of additional staff and increase the data entry rate. Furthermore, in an automatic system, since the operator is not involved in the process, the system acquires the trait of user-independence. One of the advantages of such a user-independent system is that the data entered are immune to operator errors since these systems always work in the same way.

Besides, an increase in the recognition success is aimed at through automatic segmentation of letters on the cartridge case base (1) and elimination of possible negative effects that might emerge in the automatic comparison process.

This invention relates to a model-based method that makes segmentation on the basis of surface height matrix of the cartridge case base.

BRIEF DESCRIPTION OF THE DRAWINGS

The system designed to conduct the work by using the subject method of this invention and other illustrative figures are illustrated in the annex, and among these illustrations.

Parts in the figure are each given a number and the legend that corresponds to each number is as follows:
1. Cartridge case base
2. Primer
3. Ejector mark
4. Firing pin mark

Parts in the figure are each given a number and the legend that corresponds to each number is as follows:
5. Surface height matrix
6. Quantization
7. Magnitude of the resultant of surface derivatives
8. Quantization
9. Smoothing
10. 21HT method
11. Center selection
12. Detected center
13. Center detection module
14. Normalization
15. Polar transformation
16. One dimensional signal reconstruction
17. Signal similarity analysis
18. Circles
19. Circle detection module
20. Primer extraction
21. Quantization
22. Histogram drawing
23. Threshold selection
24. Threshold function
25. Detected firing pin mark
26. Firing pin mark detection module

Parts in the figure are each given a number and the legend that corresponds to each number is as follows:
27. Cartridge case base circle
28. Primer circle
29. Primer pocket gap circle

Parts in the figure are each given a number and the legend that corresponds to each number is as follows:
30. Primer border
31. Primer pocket gap border
32. Cartridge case base border

Parts in the figure are each given a number and the legend that corresponds to each number is as follows:
33. Step model 1
34. Step model 2
35. Step model 3

DETAILED DESCRIPTION OF THE INVENTION

The method can be summarized as follows: First of all, the center of the cartridge case base (1) is detected. According to this center, the surface height matrix is subjected to polar transformation and thus the polar height matrix is obtained. A one-dimensional signal is acquired by calculation of the mean value on the radius axis applied on the polar height matrix. This signal is called "Average Height Signal on the Basis of Radius" (AHSBR). On the AHSBR, regions similar to circle signal models are determined and thus circles are detected. Finally, the firing pin mark (4) region is determined by threshold processing of the primer (2) region surface height matrix. Subsequently, letters on the cartridge case base (1) are detected by using slope matrices.

Center Detection Module (13):

In order to find the center of the cartridge case base (1), a surface height matrix (5) (SHM) including the entire of the cartridge case base (1) region is quantized (6) first. On the basis of the quantized data, partial derivative of the surface is taken in the x- and y-directions ((x,y,z) is a Cartesian coordinate system and the +z-direction denotes height). The resultant vector of these two derivative values is found. In other words, the magnitude value of the surface gradient is obtained. For each point on the matrix, the magnitude (7) of the resultant of the partial derivatives taken in the x- and y-directions is quantized (8). A new matrix is formed and on this matrix, the magnitude value of the resultant of the surface derivatives calculated for each point on the SHM corresponds to the same-coordinate element of a matrix to be used to find the center. Three significant circles—primer circle (28), primer pocket gap circle (29) and cartridge case base circle (27)—are expected to appear explicitly on this matrix. In other words, the values of the matrix elements of these circles are expected to be significantly high. The acquired matrix is subjected to smoothing and it is prepared for circle detection. The method called the 2 Stage Hough Transform (21HT) method (10), referred to in "H. K. Yuen, J. Princen, J. Illingworth and J. Kittler, "Comparative study of Hough Transform methods for circle finding", Image and Vision Computing, vol. 8, no. 1, pp. 71-77, 1990", is used for circle detection.

The Hough transform method was described by P. V. C. Hough in P. V. C. Hough, "Method and means for recognizing complex patterns", U.S. Pat. No. 3,069,654, 1962. The parameter space for circle detection was proposed in R. O. Duda and P. E. Hart, "Use of the Hough transformation to detect lines and curves in pictures", Communications of the ACM, vol. 15, no. 1, pp. 11-15, January 1972. In another source (D. H. Ballard, "Generalizing the Hough transform to detect arbitrary shapes", Pattern Recognition, vol. 13, no. 2, pp. 111-122, 1981), detection of certain analytical figures in grayscale pictures by Hough transformation was described. One of these analytical figures is the circle. Several methods that use Hough transformation for circle detection are compared in H. K. Yuen, J. Princen, J. Illingworth and J. Kittler, "Comparative study of Hough Transform methods for circle finding", Image and Vision Computing, vol. 8, no. 1, pp. 71-77, 1990. Parameter information on the realization of the 21HT method is given under the title "HoughCircles" in "CV Reference Manual" in OpenCV (Open Source Computer Vision) software library ([Online], Date of Access: 28.11.2007).

The circle detection process carried out using the Hough transformation is as follows (See: H. K. Yuen, J. Princen, J. Illingworth and J. Kittler, "Comparative study of Hough Transform methods for circle finding", Image and Vision Computing, vol. 8, no. 1, pp. 71-77, 1990):

The equation of a circle with center (a,b) and radius r is as follows:

$$(x-a)^2+(y-b)^2=r^2.$$

In an image, any edge point (x,y) may be located on a circle. In order to understand whether a point is located on the circle, first, an operation is made in the Hough space. The Hough space consists of three parameters, a, b and r, for the circle. Possible quantized values of these three parameters are determined. These values receive votes from the edge points on the image. Circles are detected from among the circle parameters with the highest number of votes.

In order to reduce the operational memory space and the processing time, the 21HT method divides the problem into two stages. First of all, the circle centers (a,b) are estimated in the 2-dimensional parameter space. According to these centers, circles are sensed in 1-dimensional parameter space (r).

In this invention, the 21HT method (10) was used for the selection of the center of the cartridge case base (1). This is because the three circles—primer circle (28), primer pocket gap circle (29) and cartridge case base circle (27)—located explicitly on the cartridge case base (1) are approximately concentric. Thus, in the 2-dimensional parameter space (a,b), the center of these circles are expected to receive the highest number of votes. As a consequence, the circle center receiving the highest number of votes can be accepted as the center of the cartridge case base (1) (11). Another approach used to find the center is as follows: Following the selection of the circle center receiving the highest number of votes, the circle centers that are not located at a certain distance from this circle center are not accepted as the circle center, although their parameters receive a high number of votes. Since the caliber size is known, attention is paid to ensure that the cartridge case base (1) covers the image (matrix) as far as possible. In other words, the cartridge case base (1) fills almost the entire image. Thus, among the circle centers detected, the one which is the closest to the image center may be accepted as the center of the cartridge case base (1). Several circles may be detected by the 21HT method (10). The centers of these detected circles are ranked according to their distance to the center of the image. The circle center that is the closest to the center of the image may be accepted as the center of the cartridge case base (1) (11).

Circle Detection Module (19):

First, the surface height matrix (5) is normalized (14) linearly in the interval [0, 1]. On the basis of the detected center (12) by the method described above, this normalized surface height matrix is subjected to polar transformation (15). Let the values of a point P located on the Cartesian coordinate system be a and b respectively on the x- and y-axes. The values c and d, which are respectively the locations of point P on the r-(radius) and q-(angle) axes of the polar coordinates calculated according to a center $C(x_c, y_c)$, are found as follows:

$$c = \sqrt{(a-x_c)^2 + (b-y_c)^2},$$
$$d = \tan^{-1}\left(\frac{b-y_c}{a-x_c}\right).$$

On the polar height matrix, for each radius value, all data corresponding to that single radius value are added and the mean value is calculated. Thus, average height values are obtained on the basis of radius. A one-dimensional sign (16) is established with these mean values acquired on the basis of each radius value. This one-dimensional sign is called "Average Height Signal on the Basis of Radius" (AHSBR). With the model-based signal similarity analysis (17) carried out on the AHSBR, the circles (18)—primer circle (28), primer pocket gap circle (29) and cartridge case base circle (27)—are detected. Step function is used as a model. On the one-dimensional sign, the regions most appropriate for the step function are detected with the similarity analysis. The concave regions have lower values in the one-dimensional sign. This means, the regions outside the cartridge case base (1) and the primer pocket gap give lower values. Again, similarly, on the primer (2) region, areas outside the firing pin mark (4) and the cartridge case base (1) give high values.

Figure 4:
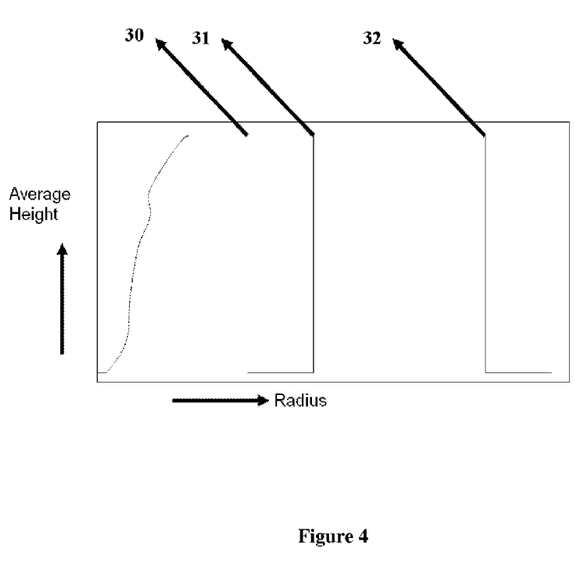
FIG. 4 is the general outline of a representative AHSBR drawing.

The general outline of a representative AHSBR drawing is given in FIG. 4. First of all, the primer border (30) can be detected. For that purpose, the step model 1 (33) is used in an interval higher than a certain radius value (R1) and lower than a certain radius value (R2) to carry out a signal similarity analysis. In other words, while the AHSBR is kept fixed, the step model 1 (33) is wandered throughout this interval, superposed with the AHSBR, and the place of highest similarity is found. In this interval, the place of highest similarity is the primer border (30). Then, the primer pocket gap border (31) can be detected. For that purpose, on the AHSBR, a signal similarity analysis is carried out with a step model 2 (34) used in an interval higher than the radius value of the primer border (30) and lower than a certain radius value (R3). In this interval, the place of highest similarity is the primer pocket gap border (31). Finally, the cartridge case base border (32) can be detected. For that purpose, on the AHSBR, a signal similarity analysis is carried out with a step model 3 (35) used in an interval higher than the radius value of the primer pocket gap border (31) and lower than the highest radius value (R3). In this interval, the place of highest similarity is the cartridge case base border (32). It is not absolutely necessary to detect the circles in the way mentioned above; yet, starting from a certain point and detecting the circles one by one may result in a faster process as it would narrow the interval in which the similarity computation is to be carried out. The intervals in which similarity computations are to be carried out may be determined according to the radii of the cartridge cases.

For the signal similarity analysis,—although the criteria are not limited to the ones described below—any of the criteria described below may be used. One of them is correlation analysis. Further detailed basic information on correlation analysis can be found in "Pattern Classification" (R. O. Duda, P. E. Hart, D. G. Stork, Pattern Classification, 2nd ed., A Wiley-Interscience Publication, John Wiley & Sons, 2001) and "Discrete Random Signals and Statistical Signal Processing" (C. W. Therrien, Discrete Random Signals and Statistical Signal Processing, Prentice Hall, 1992).

For two one-dimensional, separate signals S1(t) and S2(t), with variable t, the correlation analysis may be carried out as follows: Let the length of the signs be U and the length of the region in which the correlation analysis is to be carried out be W. Let the mean values of S1(t) and S2(t) be $O_{S1}$ and $O_{S2}$, respectively. While signal S1 is kept fixed, signal S2 is shifted at an amount of T on plane t.

Cross Correlation (CI): This is the cross correlation function of two signs. At point T, where the two signals are most similar with each other, the CI value is the highest. This is shown in the following formula:

$$CI(T) = \frac{1}{W} \sum_{t \in W} (S1(t) \times S2(t-T)).$$

Normalized Cross Correlation Coefficient (DIK): This is the normalized cross correlation coefficient of two images. At value T, where the two signals are most similar with each other, the DIK value is the highest. This is shown in the following formula:

$$DIK(T) = \frac{\sum_{t \in W}(S1(t) - O_{S1})(S2(t-T) - O_{S2})}{\sqrt{\sum_{t \in W}(S1(t) - O_{S1})^2} \sqrt{\sum_{t \in W}(S2(t-T) - O_{S2})^2}}.$$

For signal similarity analysis, the equations described below may also be used:

Mean Square Difference (FKO): This is the mean of the square of the difference of two signals. At value T, where the two signs are the most similar with each other, the FKO value is the lowest. This is shown in the following formula:

$$FKO(T) = \frac{1}{W} \sum_{t \in W} (S1(t) - S2(t-T))^2.$$

Mean Absolute Difference (MFO): This is the mean of the absolute differences of two signals. At value T, where the two signs are the most similar with each other, the MFO value is the lowest. This is shown in the following formula:

$$MFO(T) = \frac{1}{W} \sum_{t \in W} |S1(t) - S2(t-T)|.$$

Figure 5:
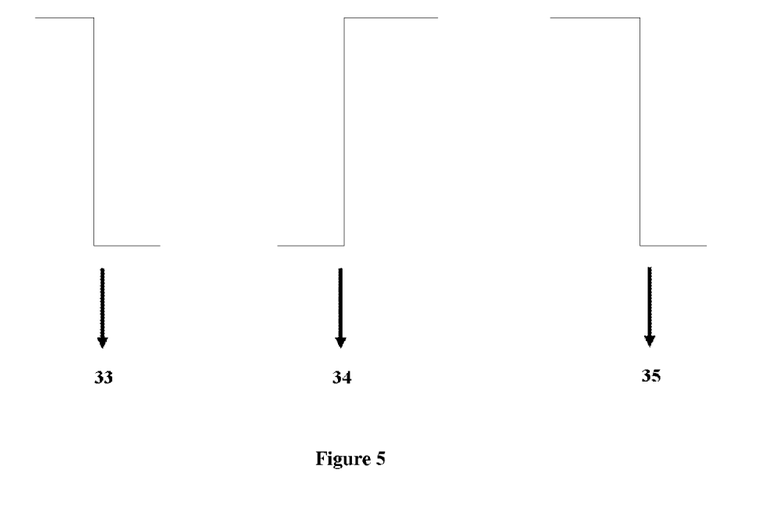
FIG. 5 shows the step models.

Drawings of step models are given in FIG. 5. The mathematical definitions of signals of step model 1 (33), step model 2 (34) and step model 3 (35) are as follows:

Step Model 1 (33) Signal (BM1): Let L1<0, L2>0, V1max≤1 and V1min≥0. It is defined as follows. The function is defined in interval [L1,L2].

$$BM1(t) = \begin{cases} V1\max, & \text{If } L1 \le t < 0, \\ V1\min, & \text{If } 0 \le t \le L2. \end{cases}$$

Step Model 2 (34) Signal (BM2): Let L3<0, L4>0, V2max≤1 and V2min≥0. It is defined as follows. The function is defined in interval [L3,L4].

$$BM2(t) = \begin{cases} V2\min, & \text{If } L3 \le t < 0, \\ V2\max, & \text{If } 0 \le t \le L4. \end{cases}$$

Step Model 3 (35) Signal (BM3): Let L5<0, L6>0, V3max≤1 and V3min≥0. It is defined as follows. The function is defined in interval [L5,L6].

$$BM3(t) = \begin{cases} V3\max, & \text{Eger } L5 \le t < 0, \\ V3\min, & \text{Eger } 0 \le t \le L6. \end{cases}$$

Values V1max, V2max and V3max are either 1 or very close to 1. Values V1min, V2min and V3min are either 0 or very close to 0. These values are values determined according to the linear normalization of the surface height matrix (5) in interval [0, 1]. In the event that the surface height matrix attains a value in another interval, these values may change.

There may be an error in detection of the circle center of the cartridge case base (1). In pixel coordinates, the circle center may be detected not accurately but within a neighborhood of a certain number of pixels. Thus, improvement can be made on the detected center. For that purpose, a cost function is defined by using the signal similarity values—relevant similarity values of step model 1 (33), step model 2 (34), step model 3 (35)) with AHSBR—acquired by the method within the circle detection module. Effort is made to either increase this cost above or decrease it below a certain value. The issue of whether to increase or decrease depends on how the cost is defined. For example, if the cross correlation function is defined as the cost function, then effort is made to increase the cost value above a certain value. Wandering in a neighborhood, the center of which is the center of the cartridge case base (1), it may be possible to find a more accurate circle center. However, this process increases the burden of calculation.

Firing Pin Mark Detection Module (26):

The firing pin mark (4) region is accepted to be an increasingly deepening region in the primer (2) region. In order for the estimation of the firing pin mark (4), first, the surface height matrix of the primer (2) region, where the firing pin mark (4) is located, is extracted from the entire surface height matrix (5) by primer extraction (20). In this process, a circular region which is a bit smaller than the primer (2) radius is selected. This is because distortions on the outer borders of the primer (2) and possible errors in the detection of the primer (2) circle may result in errors in selection of the firing pin mark (4). The primer (2) region selected is quantized (21) and a histogram of this quantized data is obtained (22). If one accepts that, in the primer (2) region, the area outside the firing pin mark (4) is rather plane, then the histogram should have a peak value. A threshold which is smaller than the peak value is selected (23) and the threshold function (24) is applied. Regions below the adaptively selected threshold value are accepted as the detected firing pin mark (25) region. In this detected firing pin mark (25) region, if there are empty areas that are not included in this region, these areas shall be included in the detected firing pin mark (25) region.

Letter and Sign Detection

There are certain letters and signs outside the primer (2) area on the cartridge case base (1). These signs are regions that should not be used in the comparison process. Thus, these signs and letters should be detected in the first place and comparison of these regions should be made accordingly. For detection of these regions on the surface height matrix, certain clues are used. The surface slope values of the circumference of these letters and signs are very high. This means, the surface has a sharp proclivity of almost 90 degrees. Thus, partial derivative of the surface taken in x- and y-directions may be used in detection of these regions. The resultant vector of these two derivative values is found. In other words, the magnitude of the surface gradient is obtained. For each point on the matrix, the magnitude (7) of the resultant of the surface derivatives is quantized (8). A new matrix is formed and on this matrix, the gradient magnitude value for each point corresponds to the same-coordinate element of a matrix to be used for sign and letter detection. On this matrix, regions that are above a certain threshold value are selected. In order to eliminate noise from among these selected regions, areas that are not bigger than a certain value are eliminated. Then, sections up to a close neighborhood of these remaining areas are also added to them. Thus the letter and sign regions are detected.

Another approach to be used in this work is as follows: a gradient magnitude matrix (GMM) is formed with the magnitude of the surface gradient at each point obtained by the method explained above. Again, a gradient is applied on this matrix. A matrix is formed with the magnitude values of this gradient. A new matrix is formed and on this matrix, the gradient magnitude value for each point corresponds to the same-coordinate element of a matrix to be used for sign and letter detection. In order to eliminate noise from among these selected regions, areas that are not bigger than a certain value are eliminated. Then, sections up to a close neighborhood of these remaining areas are also added to them. Thus the letter and sign regions are detected.

The following method can be used to calculate the gradient matrices of the surface.

Mathematically, we can denote SHM by $h(j,i)$. In the $h(j,i)$, j denotes the value in the x-direction and i denotes the value in the y-direction on the Cartesian coordinate system. The height value of the point $(j,i)$ on the matrix, in other words, the value of the matrix at that point, is $h(j,i)$. $h(j,i)$ is a height function sampled in equal intervals. First of all, for each pixel, a second-degree polynomial $(p(j,i)=a\ j^2+bi^2+c\ ji+d\ j+ei+f)$, which covers the pixel and its surrounding pixels is fitted. While fitting the polynomial, around the pixel, a square area with a width of WR is taken into consideration. For the point n=WR*WR in the window, we can write the equations in matrix form as:

$$\begin{bmatrix} j_1^2 & i_1^2 & j_1 i_1 & j_1 & i_1 & 1 \\ \vdots & \vdots & \vdots & \vdots & \vdots & \vdots \\ j_n^2 & i_n^2 & j_n i_n & j_n & i_n & 1 \end{bmatrix} \begin{bmatrix} a \\ b \\ c \\ d \\ e \\ f \end{bmatrix} = \begin{bmatrix} h_1 \\ \vdots \\ h_n \end{bmatrix}$$

or $$yx = s.$$

In the equation above, there are n equations for 6 variables. The system of equations can be solved in the least squares sense. The difference of the expected height values and the values at the surface gives the error to be minimized. The solution which minimizes this error is:

$$x=((y^T y)^{-1} y^T)s.$$

The part in the parentheses is the pseudo-inverse of y. Thus, we find the surface parameters.

Computation of the gradient: The gradient can be computed from the surface parameters as follows (See. Bryan S. Morse, Brigham Young University, "Lecture 11: Differential Geometry", 2000. Source: Online, Date of last access: Feb. 8, 2008): The gradient is defined as follows:

$$\nabla h = \begin{bmatrix} L_j \\ L_i \end{bmatrix} = \overline{g}$$

where $$L_j \triangleq \frac{\partial h}{\partial j} = 2aj + ci + d,$$

$$L_i \triangleq \frac{\partial h}{\partial i} = 2bi + cj + e.$$

The direction of the gradient is the direction of the vector $\overline{g}$, and it can be computed as follows:

$$\phi = \tan^{-1}\left(\frac{L_i}{L_j}\right).$$

Its magnitude, on the other hand, can be found as follows:

$$|\overline{g}|=\sqrt{L_j^2+L_i^2}.$$

The invention claimed is:

1. A method which, while preparing data for comparison methods that compare cartridge cases fired from firearms and compute similarity values, segments the cartridge case bases by using surface height matrices for selection of the best appropriate mark regions to be used in similarity computation, characterized by the following steps which aim at detection of a primer circle (28), primer pocket gap circle (29) and cartridge case base circle (27):
   a) finding gradient magnitude values for each element on a surface height matrix (5) that covers all of a cartridge case base (1) region and forming a new matrix by locating the gradient magnitude values in such a way that they correspond to the coordinates of each element on the surface height matrix (5);
   b) detecting coordinates of a center of the cartridge case base by using Hough transformation on the matrix formed in a);
   c) transforming the surface height matrix of the cartridge case base according to the coordinates of the detected center of the cartridge case base into polar coordinates and obtaining a polar height matrix;
   d) on the polar height matrix, for each radius value, selecting all data corresponding to the each radius value and calculating the mean value of the all data corresponding to the each radius value;
   e) forming a one-dimensional signal, called 'Average Height Signal on the Basis of Radius' (AHSBR) with the calculated mean values as a function of radius value, wherein the x-axis of the signal shows the radius value and the y-axis shows the calculated mean values corresponding to the radius;
   f) detecting the primer circle (28), primer pocket gap circle (29) and cartridge case base circle (27) by using the signal similarity analysis conducted on this AHSBR on the basis of the step model 1 (33) and/or step model 2 (34) and/or step model 3 (35).

2. The method accordingly to claim 1, wherein the Hough transformation is a 2 Stage Hough Transform (2lHT) method.

3. The method according to claim 1, further comprising the following steps, after step f), for detection of a firing pin mark (4) region:
   a) distinguishing a region by distinguishing the surface height matrix of the primer circle (28), where the firing pin mark is located, from the entire surface height matrix;
   b) obtaining a histogram of the distinguished region according to the surface height matrix values,
   c) selecting a peak value of the histogram,
   d) selecting a threshold value smaller than this peak value,
   e) accepting regions below this threshold value as the firing pin mark (4) region.

4. The method according to claim 1, further comprising after step f), using surface gradient information in selection of the best appropriate mark region between the cartridge case base circle (27) and the primer pocket gap circle (29), for comparison of the cartridge cases.

5. The method according to claim 4, characterized by the following steps:
   a) selecting the region between the cartridge case circle (27) and the primer pocket gap circle (29), in order to distinguish a region where letters and signs are located from the cartridge case base;
   b) finding gradient magnitude values for each element on the surface height matrix of the selected region and forming a new matrix by locating the gradient magnitude values in such a way that they correspond to the coordinates of each element on the surface height matrix,
   c) selecting regions above a pre-determined threshold value on the new matrix formed;
   d) eliminating areas that are not larger than a pre-determined size among these selected regions;
   e) adding sections in a pre-determined neighborhood of remaining areas and thus letter and sign regions are detected;
   f) marking the letter and sign regions in order to ensure that these letter and sign regions are not taken into consideration in the similarity computation of cartridge cases.

6. The method according to claim 4, characterized by the following steps:
   a) selecting the region between the cartridge case circle (27) and the primer pocket gap circle (29) in order to distinguish a region where letters and signs are located from the cartridge case base;
   b) finding gradient magnitude values for each element on the surface height matrix of the selected region and forming a new matrix (gradient magnitude matrix) by locating the gradient magnitude values in such a way that they correspond to the coordinates of each element on the surface height matrix;
   c) finding gradient magnitude values for each element on the gradient magnitude matrix and forming a new matrix by locating the gradient magnitude values in such a way that they correspond to the coordinates of each element on the gradient magnitude matrix;
   d) selecting regions above a pre-determined threshold value on the new matrix formed;
   e) eliminating areas that are not larger than a pre-determined size among these selected regions;
   f) adding sections in a pre-determined neighborhood of remaining areas and thus letter and sign regions are detected;
   g) marking the letter and sign regions in order to ensure that these letter and sign regions are not taken into consideration in the similarity computation of cartridge cases.

7. A method which, while preparing data for comparison methods that compare cartridge cases fired from fire arms and compute similarity values, segments the cartridge case bases by using surface height matrices for selection of the best appropriate mark regions to be used in similarity computation, characterized by the following steps to detect a center of the cartridge case base:
   a) finding gradient magnitude values for each element on a surface height matrix (5) that covers all of a cartridge case base (1) region and forming a new matrix by locating the gradient magnitude values in such a way that they correspond to the coordinates of each element on the surface height matrix (5);
   b) detecting coordinates of the center of the cartridge case base by using Hough transformation on the matrix formed in a);
   c) transforming the surface height matrix of the cartridge case base according to the coordinates of the detected center of the cartridge case base into polar coordinates and obtaining a polar height matrix;
   d) adding all data corresponding to each radius value on the polar height matrix and calculating the mean value;
   e) forming a one-dimensional signal, called 'Average Height Signal on the Basis of Radius' (AHSBR) with the calculated mean values as a function of radius value, wherein the x-axis of the signal shows the radius value and the y-axis shows the calculated mean values corresponding to the radius;

f) defining the value of the signal similarity analysis conducted on this AHSBR on the basis of the step model 1 (33) and/or step model 2 (34) and/or step model 3 (35) as the cost function;

g) comparing the cost function to a predetermined value, terminating the process if the cost function is above or below the pre-determined value, using only one of the two cases (above or below the pre-determined value) according to the similarity function selected, accepting another point in a pre-determined neighborhood of the cartridge case base center in b) as the cartridge case base center and repeating the steps c), d), e), f) and g) if the intended criteria are not satisfied.

8. The method accordingly to claim 7, wherein the Hough transformation is a 2 Stage Hough Transform (2IHT) method.

* * * * *